J. ROGERS.
Car Wheel.
No. 93,123.  Patented July 27, 1869.
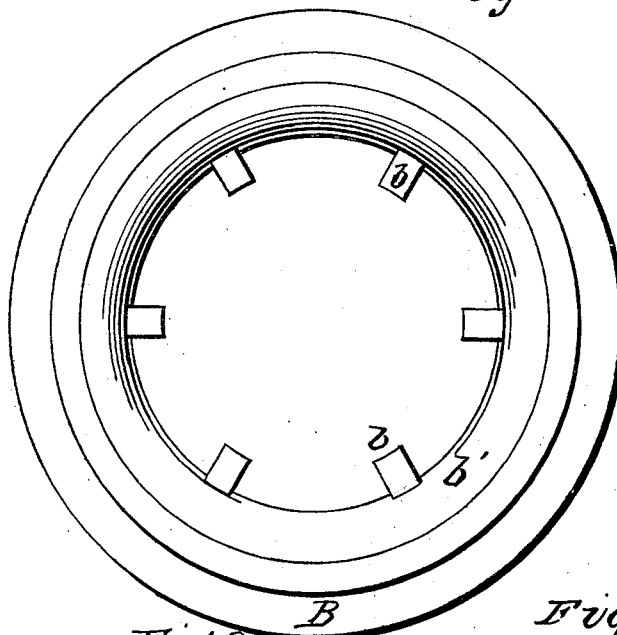
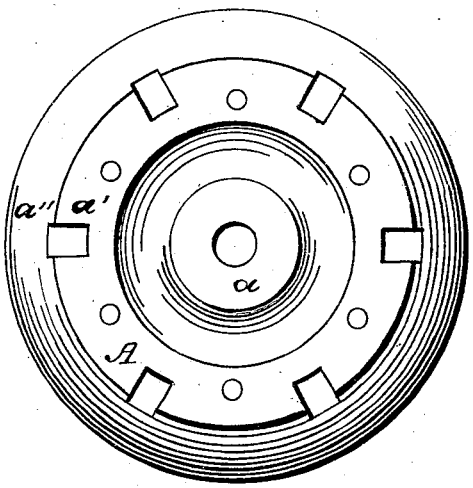
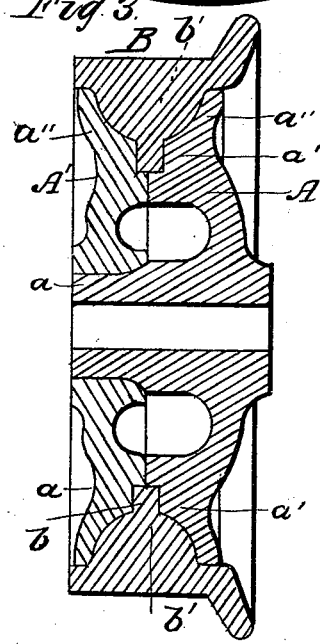
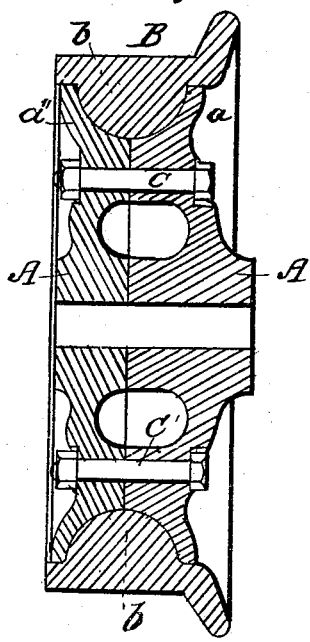
WITNESSES
Charles Pickles.
Eugene Gump
INVENTOR
John Rogers
By Frank Millerard
attorney

United States Patent Office.

JOHN ROGERS, OF CINCINNATI, OHIO.

Letters Patent No. 93,123, dated July 27, 1869.

IMPROVED RAILWAY-CAR WHEEL.

The Schedule referred to in these Letters Patent and making part of the same.

*To all whom it may concern:*

Be it known that I, JOHN ROGERS, of Cincinnati, Hamilton county, State of Ohio, have invented a certain new and useful Improvement in Car-Wheels; and I do hereby declare the following to be a sufficiently full, clear, and exact description thereof to enable one skilled in the art to which my invention appertains, to make and use it, reference being had to the accompanying drawings, which form a part of this specification.

My invention consists in providing the plates of a car-wheel with fillets upon their peripheries, and a section of a recess at the points where they come in contact, for the reception of lugs formed upon the treads of such wheels.

In the accompanying drawings—

Figure 1 is a view of the tire or tread of the wheel.

Figure 2 is a view of one-half of the body of the wheel.

Figure 3 is an axial section of the entire wheel, exhibiting my preferred construction.

Figure 4 is a slight modification of the same.

The body of the wheel is formed by the connection of two plates, A A′, preferably of cast-iron, the plate A being provided with a suitable hub, *a*, which is fitted on the axle of the car, in the usual way.

The plate A′ fits snugly over the hub *a*. (See fig. 3.)

The plates A A′ are each provided with pockets, *a′*, for the reception of corresponding lugs, *b*, on the tire B.

Fillets *a″* are formed on the periphery of the plates A A′, which, when the plates are connected together, combine, and form a groove, for the reception of the "tongue" or "rib," *b′*, of the "tire" or "tread" B.

Bolts C serve to connect the plates A A′ and tire or tread B firmly together, the lugs *b* preventing slippage of the tire around the body.

In the event of the breakage of the tread B, it is only necessary to remove the plate A′, in order to insert a new tread, there being no necessity for disturbing the plate A, or the axle on which the wheel is fitted.

It is proposed to cast the parts of the wheel in "chills," in order to insure correct fits without finishing.

It will be seen, that in the event of a breakage of the tread B, when a train is in motion, the body A A′ will roll on the rail, and serve as a temporary wheel, and thus avoid disastrous accidents.

I claim herein as new, and of my invention—

1. The plates A A′, each having a fillet, *a″*, on its periphery, and a section of a recess at or near the point where they come in contact, for the reception of the lugs *b*, upon the tread B, substantially as and for the purpose set forth.

2. The ribbed or tongued tread B, in combination with the plates A A′, substantially as and for the purpose set forth.

In testimony of which invention, I hereunto set my hand.

JOHN ROGERS.

Witnesses:
   THEO. H. JAMES,
   EUGENE TRUMP.